(12) United States Patent
Katsanis

(10) Patent No.: US 9,610,800 B2
(45) Date of Patent: Apr. 4, 2017

(54) BICYCLE WHEELS

(75) Inventor: Dimitrios Katsanis, Nottingham (GB)

(73) Assignee: Metron IP Limited, Nottinghamshire (GB)

( * ) Notice: Subject to any disclaimer, the term of this patent is extended or adjusted under 35 U.S.C. 154(b) by 713 days.

(21) Appl. No.: 13/809,615

(22) PCT Filed: Jan. 26, 2012

(86) PCT No.: PCT/GB2012/050166
§ 371 (c)(1),
(2), (4) Date: Jan. 11, 2013

(87) PCT Pub. No.: WO2012/101444
PCT Pub. Date: Aug. 2, 2012

(65) Prior Publication Data
US 2013/0113269 A1 May 9, 2013

Related U.S. Application Data

(60) Provisional application No. 61/530,087, filed on Sep. 1, 2011.

(30) Foreign Application Priority Data

Jan. 27, 2011 (GB) .................................. 1101417.2
Jul. 28, 2011 (GB) .................................. 1112995.4

(51) Int. Cl.
*B60B 21/06* (2006.01)
*B60B 21/02* (2006.01)
(Continued)

(52) U.S. Cl.
CPC ............. *B60B 21/02* (2013.01); *B60B 1/003* (2013.01); *B60B 1/0261* (2013.01); *B60B 5/02* (2013.01);
(Continued)

(58) Field of Classification Search
CPC .. B60B 1/00; B60B 1/003; B60B 1/02; B60B 1/04; B60B 1/043; B60B 21/00; B60B 21/06; B60B 21/062; B60B 21/066
(Continued)

(56) References Cited

U.S. PATENT DOCUMENTS 452,649 A * 5/1891 Powell ..................... 301/95.101
521,385 A * 6/1894 Mosely .................... 301/95.101
(Continued)

FOREIGN PATENT DOCUMENTS

DE 3536308 A1 4/1987
DE 8904773 U1 6/1989
(Continued)

OTHER PUBLICATIONS

Flow past a square-section cylinder with a wavy stagnation face by Rupad M. Darekar and Spencer J. Sherwin; Department of Aeronautics, Imperial College of Science, Technology and Medicine, London, UK (Received Mar. 6, 2000 and in revised form Aug. 4, 2000); J. Fluid Mech. (2001), vol. 426, pp. 263-295.
(Continued)

*Primary Examiner* — Jason Bellinger
(74) *Attorney, Agent, or Firm* — Young Basile Hanlon & MacFarlane, P.C.

(57) ABSTRACT

A wheel for use with a bicycle includes a hub for mounting the wheel to a bicycle. The wheel includes a rim about which a tire is mountable and a plurality of spokes that extend between the hub and the rim. The rim and/or one or more of the spokes have a leading and/or trailing edge, at least part of which has an undulating configuration.

22 Claims, 16 Drawing Sheets

(51) Int. Cl.
 B60B 21/00 (2006.01)
 B60B 1/00 (2006.01)
 B60B 5/02 (2006.01)
 B60B 1/02 (2006.01)
(52) U.S. Cl.
 CPC ............ B60B 21/00 (2013.01); B60B 21/062 (2013.01); B60B 21/066 (2013.01); *B60B 2900/111* (2013.01); *B60B 2900/1216* (2013.01); *B60B 2900/311* (2013.01); *B60Y 2200/13* (2013.01); *B60Y 2200/134* (2013.01)
(58) Field of Classification Search
 USPC .............. 301/55, 58, 95.101, 95.107, 95.108
 See application file for complete search history.

(56) References Cited

U.S. PATENT DOCUMENTS

| | | | | |
|---|---|---|---|---|
| 1,402,003 | A * | 1/1922 | Miller | 301/29.2 |
| 4,793,659 | A * | 12/1988 | Oleff et al. | 301/64.704 |
| 5,088,665 | A | 2/1992 | Vijgen et al. | |
| 5,975,645 | A * | 11/1999 | Sargent | B60B 1/003 301/55 |
| 6,402,256 | B1 | 6/2002 | Mercat | |
| 6,425,641 | B1 | 7/2002 | Herting | |
| 6,991,298 | B2 * | 1/2006 | Ording | B60B 5/02 29/894.35 |
| 7,029,073 | B2 * | 4/2006 | Chen | 301/58 |
| 7,114,785 | B2 | 10/2006 | Ording et al. | |
| 7,140,695 | B2 * | 11/2006 | Passarotto | 301/58 |
| 7,562,940 | B2 | 7/2009 | D'Aluisio | |
| 8,757,733 | B2 * | 6/2014 | Smart | B60B 21/025 301/95.102 |
| 8,888,195 | B1 * | 11/2014 | Hed | B60B 21/02 301/95.101 |
| 2003/0127907 | A1 | 7/2003 | Chen | |
| 2007/0200422 | A1 | 8/2007 | Davis et al. | |
| 2008/0296962 | A1 | 12/2008 | Tsai | |
| 2009/0236902 | A1 | 9/2009 | Zibkoff | |
| 2009/0322145 | A1 | 12/2009 | Rinard | |

FOREIGN PATENT DOCUMENTS

| | | |
|---|---|---|
| DE | 20202273 U1 | 6/2002 |
| EP | 0368480 A1 | 5/1990 |
| EP | 0808728 A2 | 11/1997 |
| EP | 1262334 A2 | 12/2002 |
| EP | 1428685 A2 | 6/2004 |
| EP | 1894745 A1 | 3/2008 |
| FR | 2536705 A1 | 6/1984 |
| JP | 2008056234 A | 3/2008 |
| WO | 9857812 A1 | 12/1998 |
| WO | 2004091937 A1 | 10/2004 |
| WO | 2011124342 A1 | 10/2011 |

OTHER PUBLICATIONS

Hydrodynamic Design of the Humpback Whale Flipper; Frank E. Fish and Juliann M. Battle, Department of Biology, West Chester University, West Chester, PA; Journal of Morphology 225:51-60 (1995).

The Influence of Passive, Leading Edge Tubercles on Wing Performance; P. Watts, Applied Fluids Engineering, Inc., Long Beach, CA; and F. E. Fish, West Chester University, Department of Biology, West Chester, PA; Aug. 2001.

* cited by examiner (a)

| Wheel | Yaw Angle (deg) | Speed (m/s) | Lift (N) | Drag (N) | Side Force (N) | Torque (Nm) | Centre of Pressure X (m) | Y (m)* |
|---|---|---|---|---|---|---|---|---|
| (a) | 0 | 15 | -0.087 | 1.419 | -0.034 | 0.114 | - | - |
|  | 5 | 15 | -0.059 | 1.191 | 4.835 | 0.115 | 0.0182 | -0.0361 |
|  | 10 | 15 | 0.054 | 0.941 | 8.617 | 0.118 | 0.0385 | -0.0347 |
|  | 15 | 15 | 0.205 | 1.745 | 9.197 | 0.115 | 0.0323 | -0.0194 |
|  | 20 | 15 | 0.168 | 2.058 | 11.594 | 0.114 | 0.0239 | -0.0173 |
| (b) | 0 | 15 | -0.064 | 1.297 | -0.026 | 0.114 | - | - |
|  | 5 | 15 | 0.003 | 1.217 | 3.328 | 0.115 | -0.0592 | -0.0238 |
|  | 10 | 15 | 0.249 | 1.463 | 5.808 | 0.118 | -0.0722 | -0.0209 |
|  | 15 | 15 | 0.225 | 1.849 | 7.621 | 0.116 | -0.0557 | -0.0160 |
|  | 20 | 15 | 0.197 | 1.944 | 10.091 | 0.114 | -0.0230 | -0.0128 |
| (c) | 0 | 15 | -0.085 | 1.365 | -0.026 | 0.115 | - | - |
|  | 5 | 15 | -0.029 | 1.169 | 4.470 | 0.117 | 0.0028 | -0.0361 |
|  | 10 | 15 | 0.096 | 0.932 | 8.090 | 0.120 | 0.0171 | -0.0288 |
|  | 15 | 15 | 0.101 | 1.669 | 8.622 | 0.116 | 0.0117 | -0.0172 |
|  | 20 | 15 | 0.015 | 2.050 | 10.929 | 0.115 | 0.0123 | -0.0179 |
| (d) | 0 | 15 | -0.086 | 1.315 | -0.011 | 0.110 | - | - |
|  | 5 | 15 | -0.017 | 1.295 | 4.077 | 0.110 | -0.0026 | -0.0318 |
|  | 10 | 15 | 0.152 | 1.610 | 6.292 | 0.113 | -0.0727 | -0.0231 |
|  | 15 | 15 | 0.247 | 1.808 | 9.519 | 0.112 | -0.0162 | -0.0213 |
|  | 20 | 15 | 0.148 | 1.873 | 12.442 | 0.113 | 0.0122 | -0.0119 |

** For CoP position, positive X indicates direction towards the front of the wheel from the centre of the axle.
*** For CoP position, positive Y indicates direction towards the top of the wheel from the centre of the axle.

BICYCLE WHEELS

TECHNICAL FIELD

This invention relates to improvements in bicycle wheels, and in particular to a bicycle wheel having an improved rim configuration.

BACKGROUND

Conventional bicycle wheel rims are manufactured from straight extruded sections of material, such as metal, which are cut, bent into a hoop shape and the ends bonded, welded or otherwise joined together. Alternatively, the wheel rims may be formed from a composite material such as carbon fibre reinforced plastic. Such rims are made directly into a hoop shape and so the above bending step is not required. In both of the above arrangements, the rim has a constant depth at all points around its perimeter. Spokes are then connected to various points around the radially inner surface of the wheel rim. Alternatively, the bicycle rim and spokes are formed integrally from composite materials.

In use, conventional wheel rims may suffer aerodynamic problems. For example, conventional wheel rim designs may result in a large amount of drag on the wheel, reducing the speed of the bicycle. Furthermore, movement of ambient air, travelling at a non-zero yaw angle relative to the general direction in which the bicycle is travelling, may cause a transverse resultant force to be applied to the wheel. If this force is applied at a location forward or rearward of the hub, the force will create a moment about the center of the wheel, which, in the case of the front wheel, will act to cause the wheel to steer away from the desired path. The rider must apply a steering input to counteract this. The point of action of this force on the wheel is known as the center of pressure. In particular, the center of pressure is defined as the point at which the moment about the vertical and horizontal axes in the plane of the wheel is zero (i.e. zero yaw and zero roll). This point is not applicable at zero yaw since the side force is effectively zero.

SUMMARY

In a first aspect A new bicycle wheel has now been devised which overcomes or substantially mitigates some or all of the above-mentioned and/or other disadvantages of the prior art.

It has been found that having leading and/or trailing edges of the rim, and/or one or more of the spokes, with an undulating configuration provides aerodynamic advantages, in use.

Hence, according to a first aspect of the invention, there is provided a wheel for use with a bicycle, the wheel comprising a hub about which the wheel is mountable to a bicycle, a rim about which a tire is mountable, and a plurality of spokes that extend between the hub and the rim, wherein the rim and/or one or more of the spokes have a leading and/or trailing edge, at least part of which has an undulating configuration.

In some embodiments, the rim has a radially inner edge, at least part of which has an undulating configuration.

Computational Fluid Dynamics (CFD) analysis has been carried out which compares the drag produced at 15 m/s on a wheel having a rim with an undulating configuration, with that produced on a wheel having a conventional, non-undulating rim. The speed of 15 m/s is chosen because it is close to the racing speed achieved by high level cyclists. The results show reduced drag in the case of the wheel having an undulating rim at a range of yaw angles.

The undulating configuration may be smooth in form. For example, the undulating configuration may be substantially devoid of angular transitions, or entirely devoid of angular transitions, between the peaks and troughs of the undulating configuration. The undulating configuration may be arranged along the full extent of the edge, such that the edge is either intermittently undulating or, most preferably, continually undulating. The peaks and troughs of the undulating configuration may be arranged at regular intervals, or irregular intervals.

The radially inner edge with an undulating configuration preferably has a radial distance that varies between the peaks and troughs of the undulating configuration. The radially inner edge may be continually undulating. In these arrangements, the radially inner edge may comprise a series of alternating concave and convex regions, which are immediately adjacent to each other. In presently preferred embodiments, each peak of the undulating configuration has a convex exterior profile, in the plane of the wheel. There may be at least three pairs of peaks and troughs along the radially inner edge of the rim, more preferably twelve and most preferably at least twenty-four.

The radially inner edge may have a regular arrangement of undulations, which have the same height, or alternatively alternate between two or more different heights, where height is defined as the radial height relative to an annular base portion of the rim. The difference in radial height between the peaks and troughs of the undulations is preferably at least 5 mm, more preferably at least 10 mm, and most preferably at least 20 mm.

One or more of the spokes may also have an undulating configuration, at least on the leading and/or trailing edges. This undulating configuration preferably has the features described above in relation to the radially inner edge of the rim.

In other embodiments, one or more of the spokes may have a leading and/or trailing edge, at least part of which has an undulating configuration. This may be in addition to, or as an alternative to, an undulating configuration on a radially inner edge of the rim.

In these embodiments, the undulating configuration may be smooth in form. For example, the undulating configuration may be substantially devoid of angular transitions, or entirely devoid of angular transitions, between the peaks and troughs of the undulating configuration. The undulating configuration may be arranged along the full extent of the edge, such that the edge is either intermittently undulating or, most preferably, continually undulating. The peaks and troughs of the undulating configuration may be arranged at regular intervals, or irregular intervals.

One or more of the spokes may have a regular arrangement of undulations, which have the same height, or alternatively alternate between two or more different heights, where height is defined as the radial height relative to an annular base portion of the rim. The difference in radial height between the peaks and troughs of the undulations is preferably at least 5 mm, more preferably at least 10 mm, and most preferably at least 20 mm.

Preferably, the one or more spokes has both a leading edge and a trailing edge and at least part of both leading and trailing edges has an undulating configuration. In preferred embodiments, the one or more spokes has a substantially oval or elliptical cross-section.

The rim preferably has side surfaces that meet at a radially inner edge of the rim. The side surfaces preferably have a smooth configuration, and are most preferably generally convex in form. In particular, the side surfaces may curve laterally outwards from the base of the rim, and then curve laterally inwards, before meeting at the radially inner edge of the rim. The separation of the lateral edges of the rim may be greater than the separation of the lateral edges of a tire attached to it, for at least part, and preferably the majority, of the rim's depth in the plane of the wheel.

The radially inner edge of the rim, with an undulating configuration, is preferably inwardly spaced from the lateral edges of the rim, and may be generally centrally aligned between the lateral edges of the rim, i.e., substantially aligned with a central plane of the wheel. In some embodiments, especially on a rear wheel, the radially inner edge of the rim may be offset, to counteract the unequal tension experienced by the spokes due to unequal "dishing". The radially inner edge is preferably rounded so as to form a smooth convex curve in a plane orthogonal to the plane of the wheel. The side surfaces are preferably configured such that the radial inner edge is defined by rounded inner portions of the side surfaces. The exterior cross-sectional profile of the side surfaces at the radial inner edge of the rim preferably has a radius of at least 5 mm, and most preferably at least 10 mm.

CFD analysis was carried out on a wheel having this rounded, radial inner edge configuration, with and without undulations according to the invention, which compared the location of the center of pressure at different yaw angles. The analysis showed that, at the yaw angles 0°, 5°, 10°, 15° and 20°, the center of pressure was located closer to the hub in the case of the wheel having a rim with an undulating configuration than in the case of the wheel having a conventional, non-undulating rim. Thus, the wheel having a rim with an undulating configuration does not experience as great a force causing the front wheel to yaw than the wheel having a conventional rim. This means the rider need not apply as large a steering input to counteract the effects of this force.

The undulating configuration may be smooth in form, with the radially inner edge of the rim comprising a series of alternating concave and convex regions, which are immediately adjacent to each other. However, it has been found that aerodynamic advantages are also provided by an arrangement in which the rim has an annular base portion and a plurality of projecting portions, at least an end portion of which has a gradually reducing width in at least the plane of the wheel, and an angular apex at which a spoke may be mounted. In particular, in these arrangements, the radially inner edge of the rim may comprise a series of concave regions, in the plane of the wheel, which are immediately adjacent to each other and separated by an angular apex.

It has also been found that this configuration of projecting portions offers advantages when at least some of the projecting portions act as support portions for the spokes of the wheel. In particular, it has been found that the support portion for each spoke may reduce the stress experienced in the rim at the point at which the spoke is mounted. Hence, at least some of the projecting portions preferably define support portions for the spokes of the wheel.

According to a further aspect of the invention there is provided a wheel for use with a bicycle, the wheel comprising a hub about which the wheel is mountable to a bicycle, a rim and a plurality of spokes that extend between the hub and the rim, wherein the rim has an annular base portion and a support portion for each spoke that projects from the base portion, at least an end portion of each support portion having a gradually reducing width in at least the plane of the wheel, to an apex at which the spoke is mounted.

The support portion for each spoke will typically project radially inwardly from the base portion, or approximately radially in the case where the spokes are connected to each side of the hub, e.g., in a cross pattern.

The wheel according to this aspect of the invention is advantageous principally because the support portion for each spoke reduces the stress experienced in the rim at the point at which the spoke is mounted. This means that a smaller quantity of material, or a lighter material, may be used to manufacture a wheel having the same strength as a conventional wheel, thereby reducing the weight of the wheel and possibly also manufacturing costs. Alternatively, a wheel may be manufactured having the same weight as conventional wheels, but with greater strength for the weight.

The support portion for each spoke is preferably shaped to reduce the concentration of stresses in the material of the rim relative to a spoke mounted to a surface having a constant radial position, i.e., a uniform radial surface. Each support portion preferably has a height, i.e., the distance the support portion projects relative to the base portion, that is at least 10%, more preferably at least 20%, and most preferably at least 25%, of the width of support portion at its base. Each support portion preferably projects at least 5 mm relative to the base portion, more preferably at least 10 mm, and most preferably at least 20 mm.

The width of the support portion in the plane of the wheel may reduce at a constant rate, in at least the region of the apex. The profile of the support portion in the plane of the wheel may therefore be generally triangular or trapezoidal, in at least the region of the apex. Alternatively, the width of the support portion reduces at an increasing rate, in the plane of the wheel. In particular, the support portion may have a convex profile, in the plane of the wheel, to each side of the apex, i.e., generally dome-shaped. In presently preferred embodiments, however, the width of the support portion reduces at a decreasing rate, in the plane of the wheel. In particular, the support portion may have a concave profile, in the plane of the wheel, to each side of the apex.

The support portion for each spoke may also have a gradually reducing width in other planes aligned with the longitudinal axis of spoke. The shape of the support portion for each spoke may therefore have a generally conical configuration. The support portion will typically have a greater width in the plane of wheel, relative to other planes aligned with the longitudinal axis of spoke, and may therefore have a cross-section in a plane perpendicular to the longitudinal axis of the spoke that is generally elliptical in shape.

The profile of the support portion is preferably smooth, at least in the plane of wheel. The support portion may have a width, in at least the plane of the wheel, that reduces continuously between the base portion and the apex at which the spoke is mounted. In particular, the radially inner surface of the support portion is preferably at an angle of more than 90 degrees to the longitudinal axis of the spoke at all positions between the base portion and the apex at which the spoke is mounted.

Each support portion may have a width at its base that is substantially equal to the separation between the spokes at the rim, such that the support portions are disposed immediately adjacent to one another. Alternatively, each support portion may have a width at its base that is less than the separation between the spokes at the rim, such that either the base portion of the rim or other formations are interposed between support portions of adjacent spokes on the radially inner surface of the rim.

The rim may include ancillary formations interposed between the support portions that are adapted to provide aerodynamic advantages, as discussed in more detail below. These formations may include projections having a similar form to the support portions. Most preferably, however, these formations have a convex profile in the plane of the wheel, and are preferably generally dome-shaped, for example with a cross-section in a plane perpendicular to the longitudinal axis of the spoke that is generally elliptical in shape.

The apex of each support portion preferably has an end surface to which the spoke is either connected, or integrally formed. In the case where the spokes are separate components from the rim, the apex of the support portion is preferably fastened to the end of the spoke. Alternatively, the spokes may be formed as part of the same component as the rim, and hence formed integrally therewith.

In presently preferred embodiments, there is a substantially smooth transition between the surfaces of the support portion and the adjacent surfaces of the spoke, for example such that there is substantially no shoulder formed between the support portion and the spoke. This is most preferably achieved by integrally forming the rim and the spokes by molding, for example in composite material. However, in some embodiments, a small shoulder may be present. The shoulder is preferably less than 15 mm, and most preferably about 10 mm or less, or about 8 mm or less, from the spoke. The end surface defined by the support portion in these embodiments, between the spoke and the shoulder, preferably has an area that is less than 50% of the cross-sectional area of the base of the support portion, i.e., the interface with the annular base portion of the rim. The area of the end surface is more preferably less than 30% of the base of the support portion, and most preferably less than 20%.

Where the spokes are formed as separate components that are fastened to the rim, the spokes are preferably attached to the associated support portions by a suitable fastener. The fastener may be adapted to put the spoke under tension when assembled. Conventional fasteners extend through an aperture in a wall of the rim, with an enlarged head being located to the radially outer side of the wall of the rim, and a threaded connector being located to the radially inner side of the wall of the rim, to which the spoke is connected. Where this type of fastener is used, the apex of the support portion may include an aperture in which the fastener is mounted, as discussed above. In these arrangements, it is also preferred that there is a substantially smooth transition between the surfaces of the support portion and the adjacent surfaces of the spoke, for example such that there is substantially no shoulder formed between the support portion and the spoke.

An alternative arrangement for fastening the spokes to the rim comprises spokes that extend through an aperture in the wall of the rim and are retained by virtue of the spoke having an enlarged head located on the radially outer side of the wall of the rim. A further alternative is that the spokes may be adhesively bonded to the rim.

Each support portion preferably has a single spoke that is aligned with, or approximately aligned with, a central axis of the support portion. In particular, the spoke may extend from the center of an end surface of the support portion. In an alternative arrangement, each support portion supports two spokes, the spokes preferably connecting to opposite sides of the hub. The support portion is preferably symmetrical, in at least the plane of the wheel, most preferably about a longitudinal axis of the spoke. Alternatively, the support portion can be non-symmetrical about the plane of the wheel, and in particular offset to one side. This can be useful in applications were the wheel spokes require unequal tension on one side of the wheel compared to the other, or in cases where other benefits are provided by this arrangement.

The annular base portion of the rim preferably has a constant radial height, and hence represents a minimum radial height of the rim, from which the support portions, and any other formations, project. The radial height of the annular base portion may be greater than the radial height of the support portions, relative to the base portion.

The hub may have a conventional form, being adapted to be rotatably mounted to the frame of a bicycle. Typically, the hub will define a projection to each side of the wheel, which is rotatably mounted to the frame. For example, the hub may comprise a cylindrical projection to each side of the wheel, which is rotatably received within corresponding openings in the frame. The spokes may be connected to the hub by suitable fastening arrangements, or formed integrally with the hub. Commonly, the hub defines connection points for connection to the spokes, which may take the form of openings within which fasteners for the spokes are located. In some embodiments the hub includes a central member having a substantially cylindrical form. The central member may be provided with raised flanges, to which the spokes are connected.

The rim may define a radially outer surface adapted to retain a tire. The radially outer surface typically defines a circumferential channel adapted to receive a tire, which may have a generally U- or V-section shape. The circumferential channel may be defined by annular support flanges, which project from each side edge of the radially outer surface. The rim may be formed from metal, or molded composite materials.

The spokes are preferably elongate in form, and arranged to provide appropriate connection between the hub and the rim for the nature of the bicycle to which the wheel will be mounted. The spokes may be formed of metal, plastics or composite material, and may have the form of rods, blades or aerodynamic sections.

The wheel will typically have three or more spokes, for example twelve, sixteen or more. Where twelve or more spokes are provided, the spokes are preferably separate components that are mounted at one end to the hub of the wheel, and at the other end to a support portion. Typically, the spokes are formed or molded separately in metal, a composite material or other suitable material, and then assembled onto the rim and hub by bonding, welding or riveting, or joined using other methods or combinations of them to form a one piece structure. However, particularly where the bicycle is intended for time trial racing, the wheel may have less than twelve spokes, for example three, four, five or six spokes. In these arrangements, the spokes are preferably integrally formed with the hub and rim of the wheel, for example by molding of composite materials.

In order to reduce weight, the rim is typically hollow, with radially inner and outer walls, connecting side walls, and a chamber defined there between. In some embodiments, the rim may include a reinforcing core material, such as polymer foam, wood such as balsa, or another internally reinforcing core material. The wheel preferably includes a tire mounted to the radially outer surface of the rim. The tire is typically inflatable, and removable from the rim when deflated. The present invention is suitable for use with a wide variety of different types of bicycle, including racing bicycles and leisure bicycles.

According to a further aspect of the invention, there is provided a bicycle having at least one wheel as described above.

BRIEF DESCRIPTION OF THE DRAWINGS

Embodiments of the invention will now be described in greater detail, by way of illustration only, with reference to the accompanying drawings, in which:

FIG. 14 shows the CFD analysis data for the wheels of FIGS. 12 and 13;

DETAILED DESCRIPTION

Figure 1:
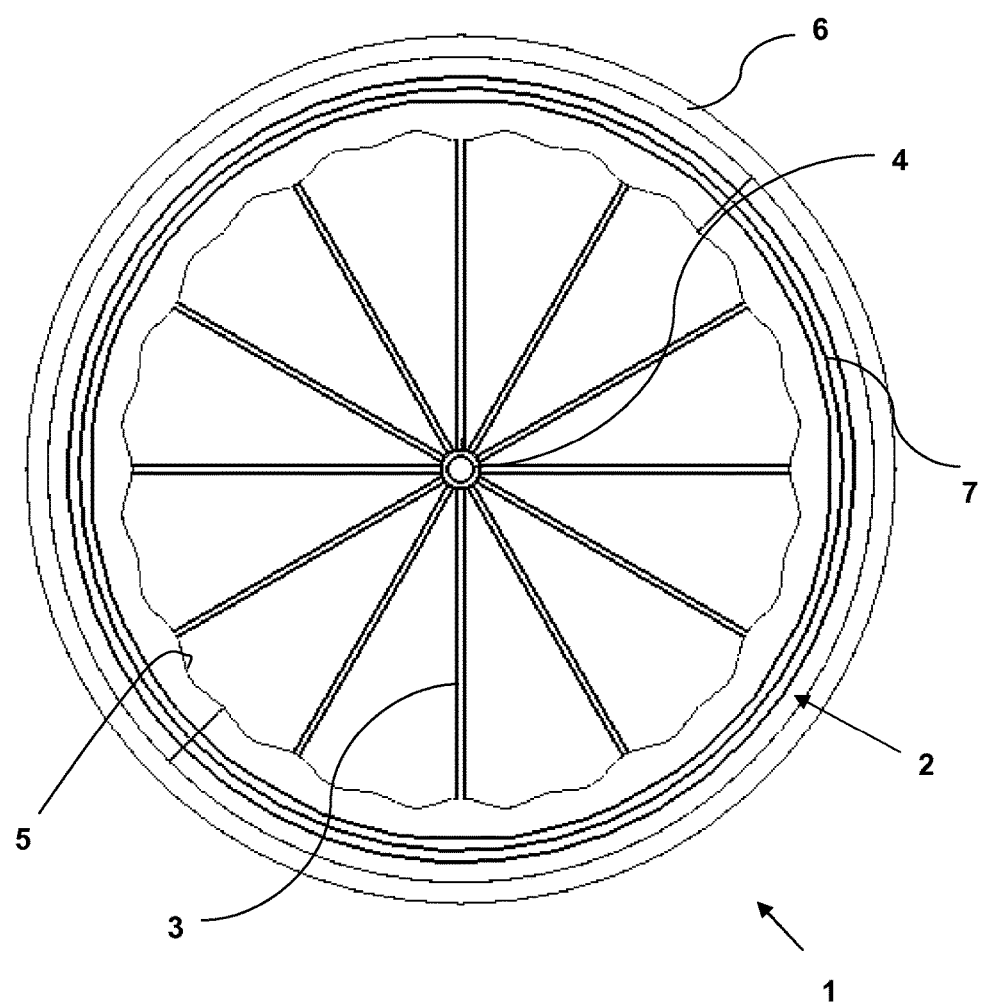
FIG. 1 is a side view of a first embodiment of a wheel according to the invention.

The first With reference to FIG. 1, a bicycle wheel is generally designated 1. The wheel 1 has an annular rim 2, elongate spokes 3 and a central hub 4.

The rim 2 has the form of a circular annulus. The rim 2 defines radially inner 5 and radially outer surfaces as well as side surfaces 7, 8. The inner surface 5 defines the inner periphery of the rim 2, i.e. it faces inwardly, towards the central hub 4. The outer surface defines the outer periphery of the rim 2, i.e. it faces outwardly, away from the hub 4.

Figure 4:
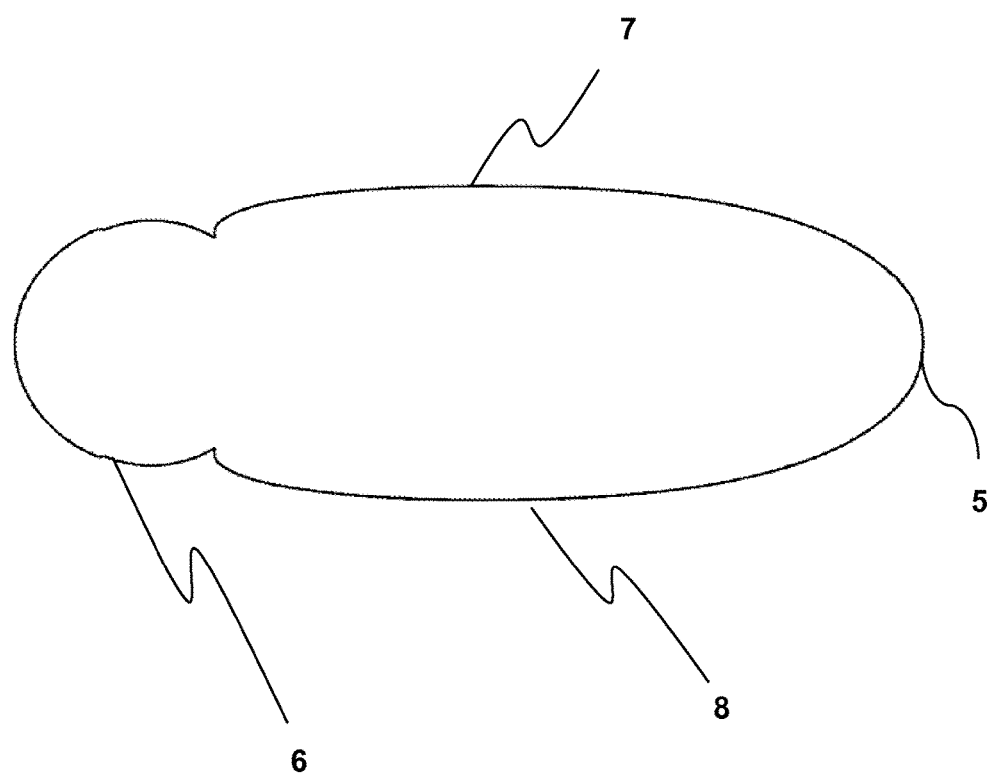
FIG. 4 is a cross-section through the rim of the wheel of FIGS. 1 to 3.

The side surfaces 7, 8 of the rim 2 are symmetrical about the plane in which the wheel 1 lies, as shown in FIG. 4. In particular, the side surfaces 7, 8 are each curved in a plane orthogonal to that in which the wheel 1 lies, and are generally convex in form. They meet at a point on the inner surface of the rim 2, in particular, at a radially inner edge of the rim. The side surfaces curve laterally outwards from the base of the rim, and then curve laterally inwards, before meeting at the radially inner edge of the rim. The side surfaces have a smooth configuration, A substantially V-shaped annular channel is provided in the outer periphery of the rim 2, within which a tire 6 is received.

Figure 2:
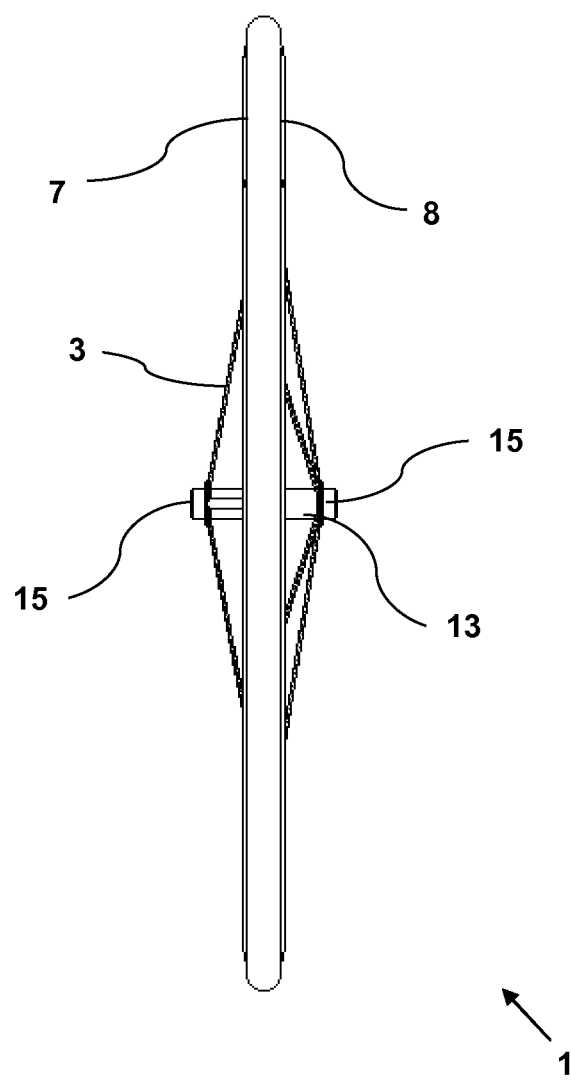
FIG. 2 is a front view of the wheel of FIG. 1.
Figure 3:
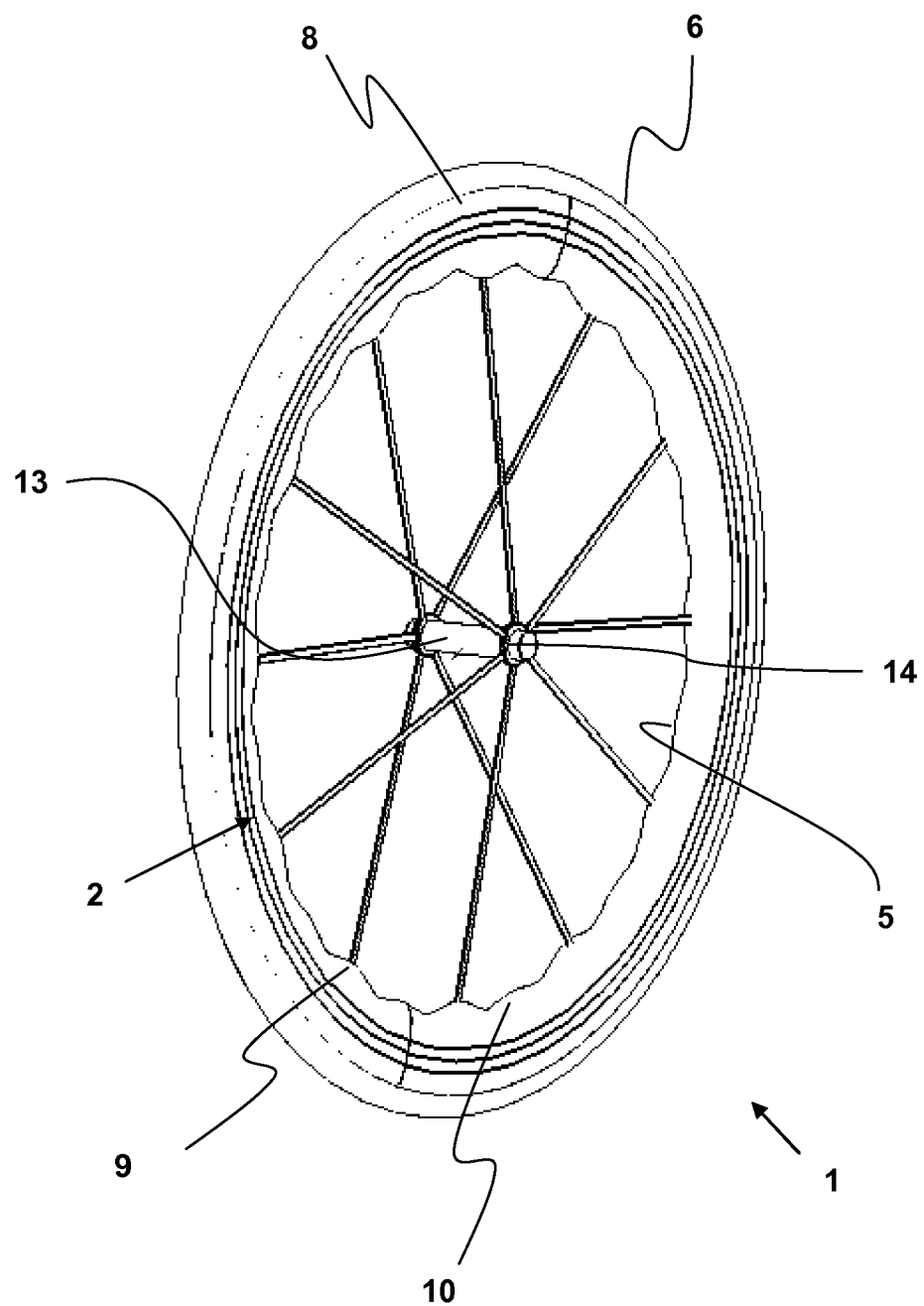
FIG. 3 is a perspective view of the wheel of FIGS. 1 and 2.

The hub 4 comprises an elongate cylinder 13. Two flanges 14 are provided on the cylinder 13, one close to each end of the cylinder 13. Each spoke 3 connects to one of the flanges 14 at connection locations on the outward-facing surface of the flange 14. These connection locations are spaced at regular intervals around the flange 14. Connection formations are provided at these locations which are adapted to connect to corresponding connection formations provided on the spokes 3. The spokes 3 are elongate metal rods. In the embodiment shown in FIGS. 1 to 3, there are twelve spokes in total. Six of the spokes are connected to one of the flanges 14, and six are connected to the other flange 14, in an alternating arrangement.

As noted above, the flanges 14 are located close to, but not at, the ends of the cylinder 13. This means that end portions 15 of the cylinder 13 project from the wheel 1 and are adapted to rotatably mount the wheel 1 to the frame of a bicycle.

The inner surface 5 of the rim 2 defines a plurality of elevations. These include support elevations 9, which are located in the region of connection of each spoke with the inner surface 5. Each support elevation 9 connects to a spoke 3. The elevations also include ancillary elevations 10, which are located between the support elevations. Both support 9 and ancillary 10 elevations have a generally dome-shape configuration. The support elevations 9 and the ancillary elevations 10 cooperate to provide a regularly undulating inner surface of the rim 102. When the wheel 1 is viewed from the side, as shown in FIG. 1, it can be seen that the support elevations 9 are slightly raised relative to the ancillary 10 elevations.

Figure 5:
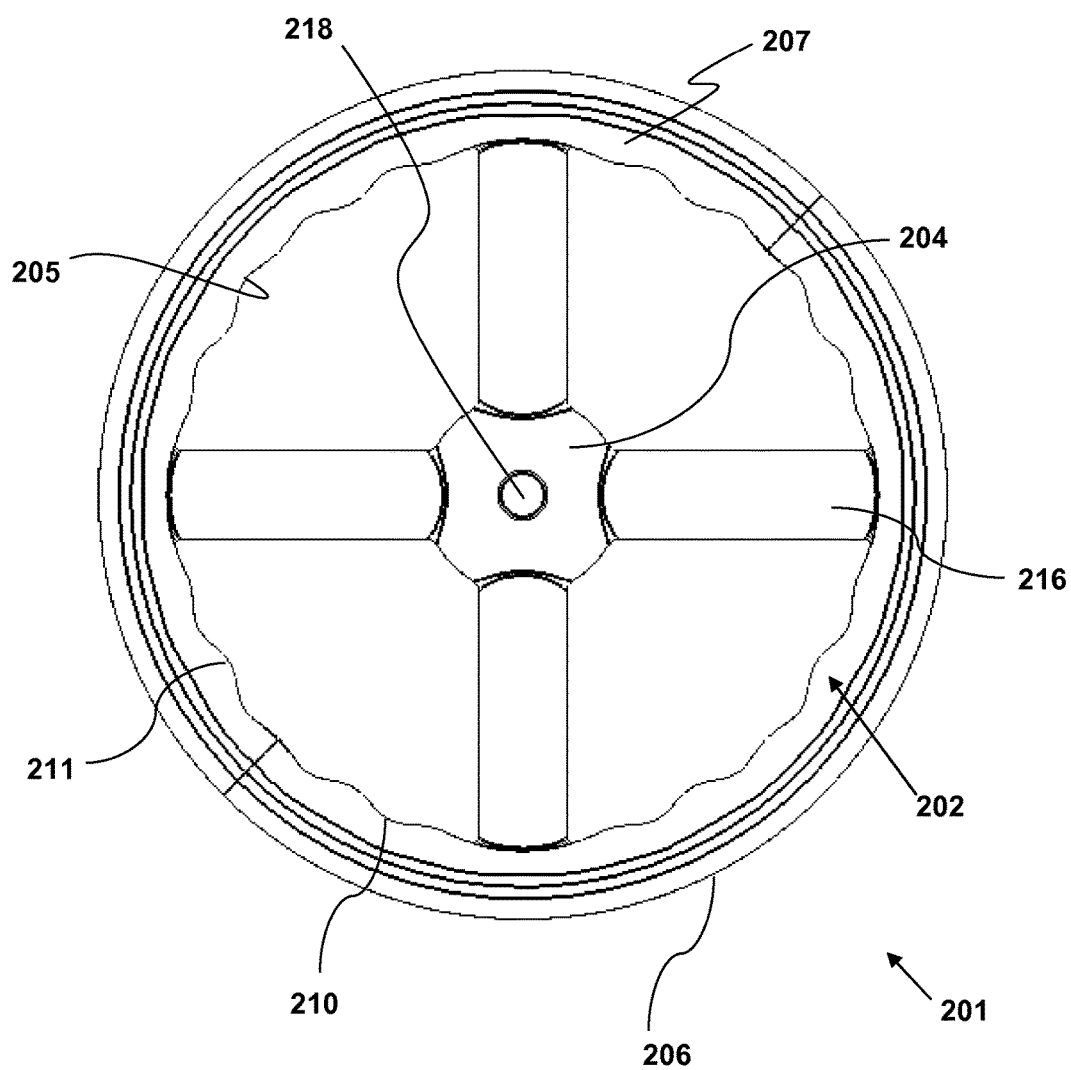
FIG. 5 is a side view of a second embodiment of a wheel according to the invention.
Figure 6:
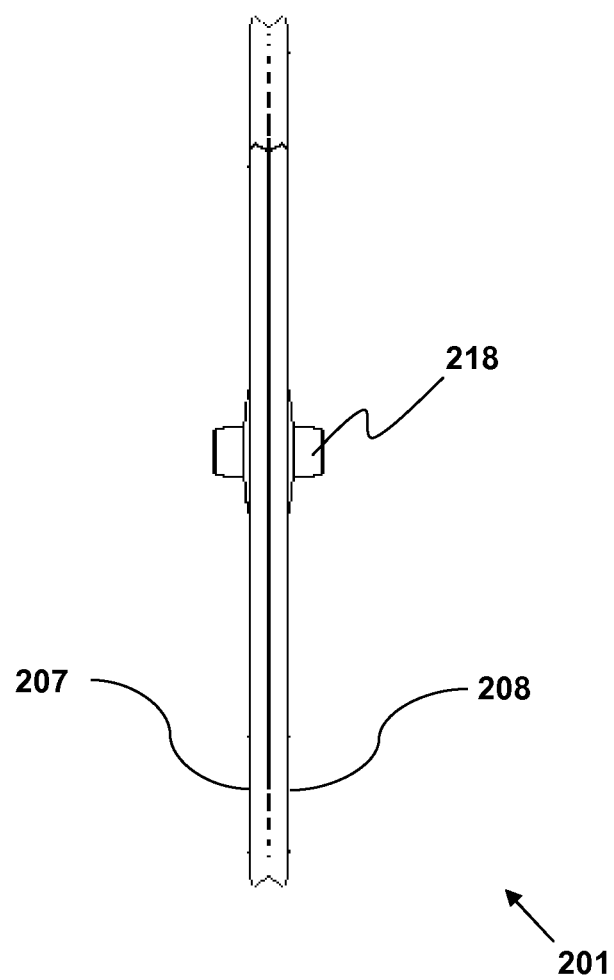
FIG. 6 is a front view of the wheel of FIG. 5.
Figure 7:
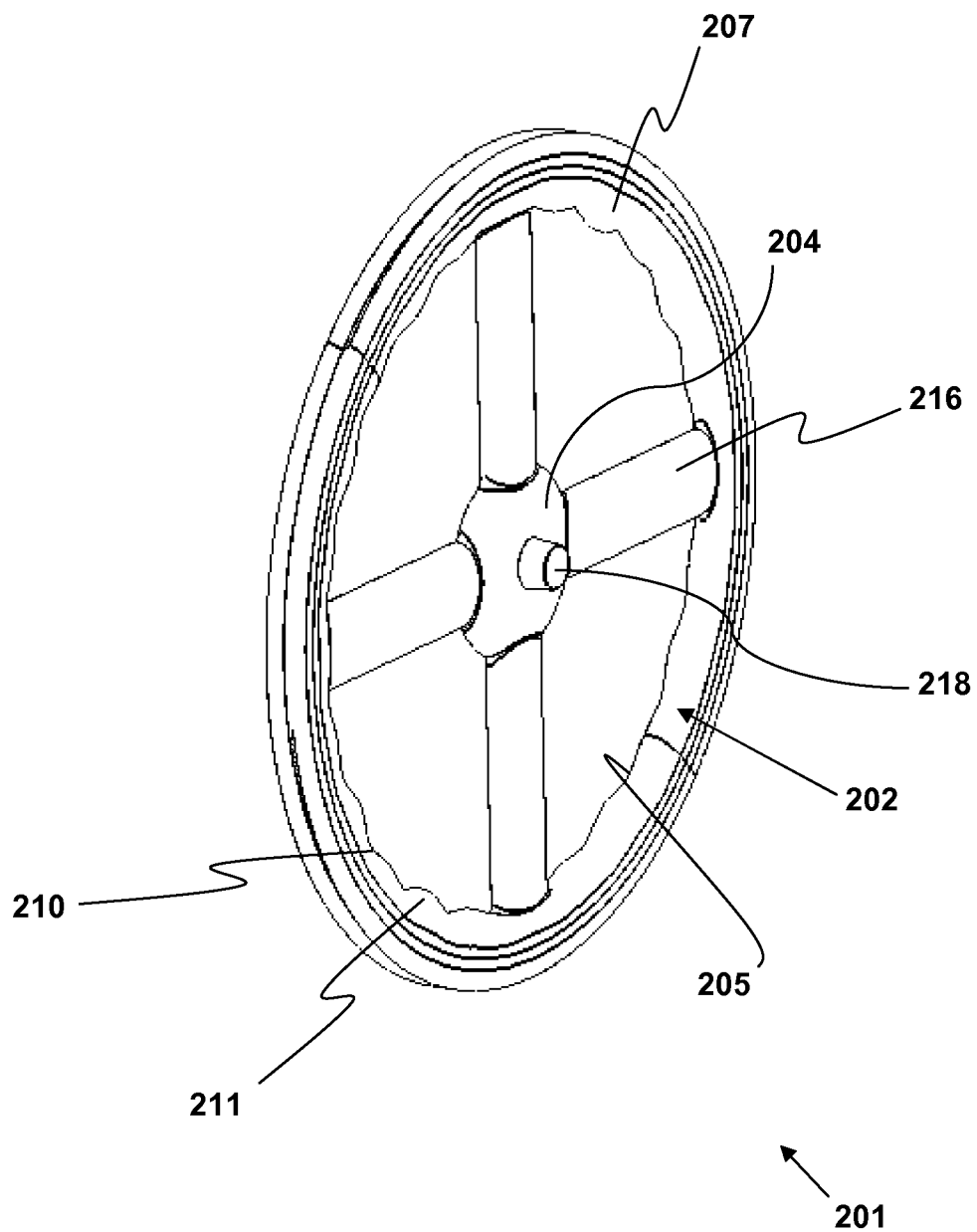
FIG. 7 is a perspective view of the wheel of FIGS. 5 and 6.

A second embodiment of a wheel according to the invention is shown in FIGS. 5 to 7, which is generally designated 201. FIG. 5 shows a bicycle wheel 201 having a rim 202 and hub 204. The rim 202 has radially inner 205 and outer 206 surfaces, and side surfaces 207,208. As with the first embodiment, the inner surface 205 defines the inner periphery of the rim 202, i.e., it faces towards the central hub 204. The outer surface 206 defines the outer periphery of the rim, i.e., it faces outwardly, away from the hub 204.

As with the first embodiment, the side surfaces 207, 208 are symmetrical about the plane in which the wheel 201 lies. The side surfaces 207, 208 are curved in a plane orthogonal to that in which the wheel 201 lies, such that they meet at an annular edge on the inner surface 205 of the rim 202.

In the example of FIGS. 5 to 7, there are four wide spokes 216. The spokes connect the inner surface 205 of the rim 202 to the hub 204. The spokes 216 connect to the inner surface 205 at equally spaced locations along the length of the inner surface 205.

Equally spaced recesses 210 are defined in the portions of the inner surface 205 which are located between the points of connection of the inner surface 205 to the spokes 203. These recesses 210 define a series of undulations, such that, when the wheel is viewed from the side as in FIG. 5, a continuous profile of elevations 211 and recesses 210 is seen. The heights of the elevations alternate between two slightly different values along the length of the inner surface, as can be seen in FIG. 5. As discussed above in relation to the first embodiment, this regularly undulating inner surface of a rim 202 has been found to provide aerodynamic advantages.

The hub 204 shown in FIGS. 5 to 7 comprises a circular disc which is oblate, ie the thickness of the disc is greater at its central region than at its periphery. The hub 204 has curved side surfaces which meet at an annular edge at the periphery of the disc, giving the disc a cigar-shaped cross-section. The hub 204 further defines a central shaft 218 projecting outwardly from the side surfaces of the hub 204. The shaft 218 is adapted to be rotatably mounted to the frame of a bicycle, for example by being received within corresponding openings in the frame.

The spokes 216 connect to the hub 204 at points that are equally spaced about the periphery of the disc.

Figure 8:
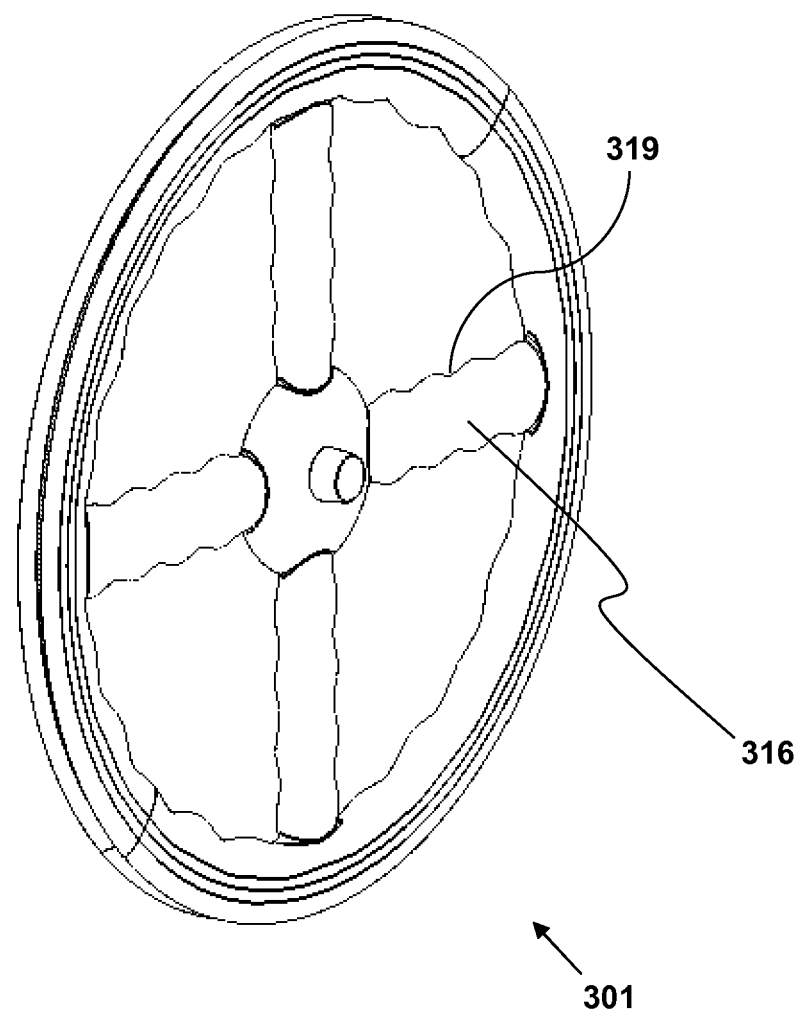
FIG. 8 is a perspective view of a third embodiment of a wheel according to the invention.

A fourth embodiment of a wheel according to the invention is shown in FIG. 8, which is generally designated 301. This differs from the embodiment shown in FIGS. 5 to 7 in that undulations 319 are also defined on the spokes 316. In particular, the undulations 319 are defined on the long edges of the spokes 316 which lie in the plane of the wheel 301. The undulating surface of the spokes 316 has also been found to provide aerodynamic advantages.

Figure 9:
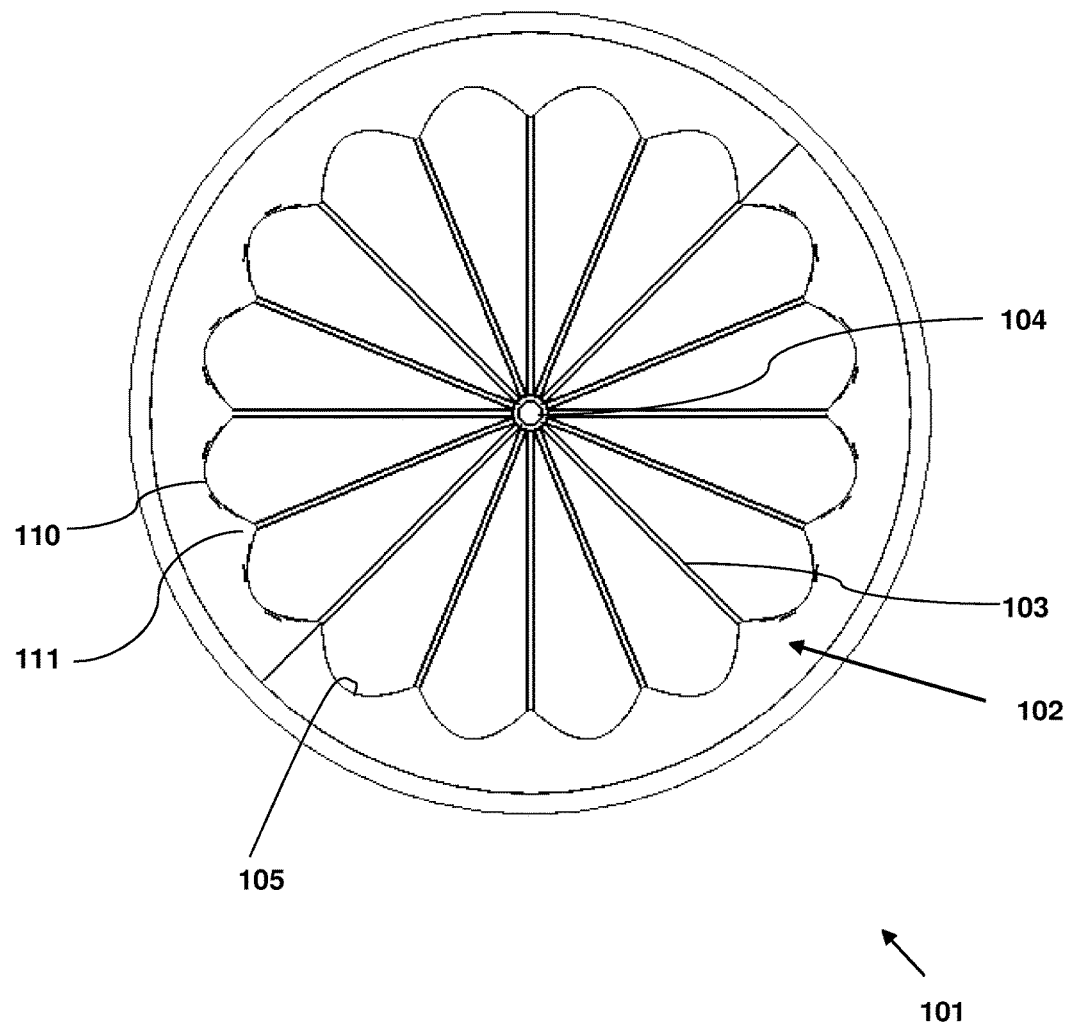
FIG. 9 is a side view of a fourth embodiment of a wheel according to the invention.
Figure 10:
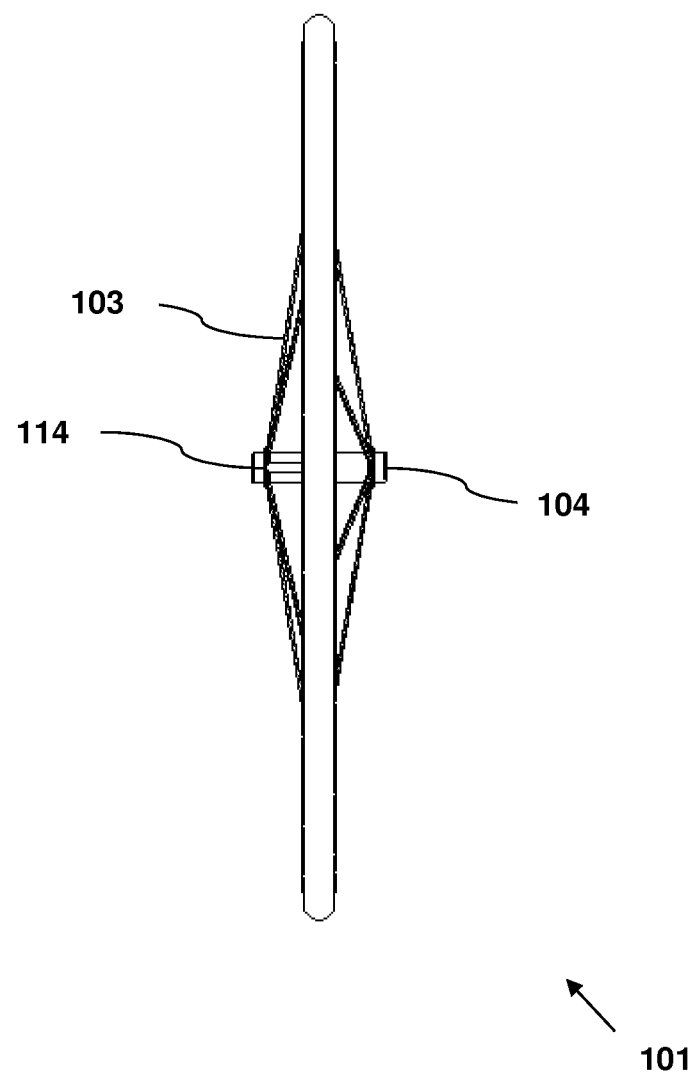
FIG. 10 is a front view of the wheel of FIG. 9.
Figure 11:
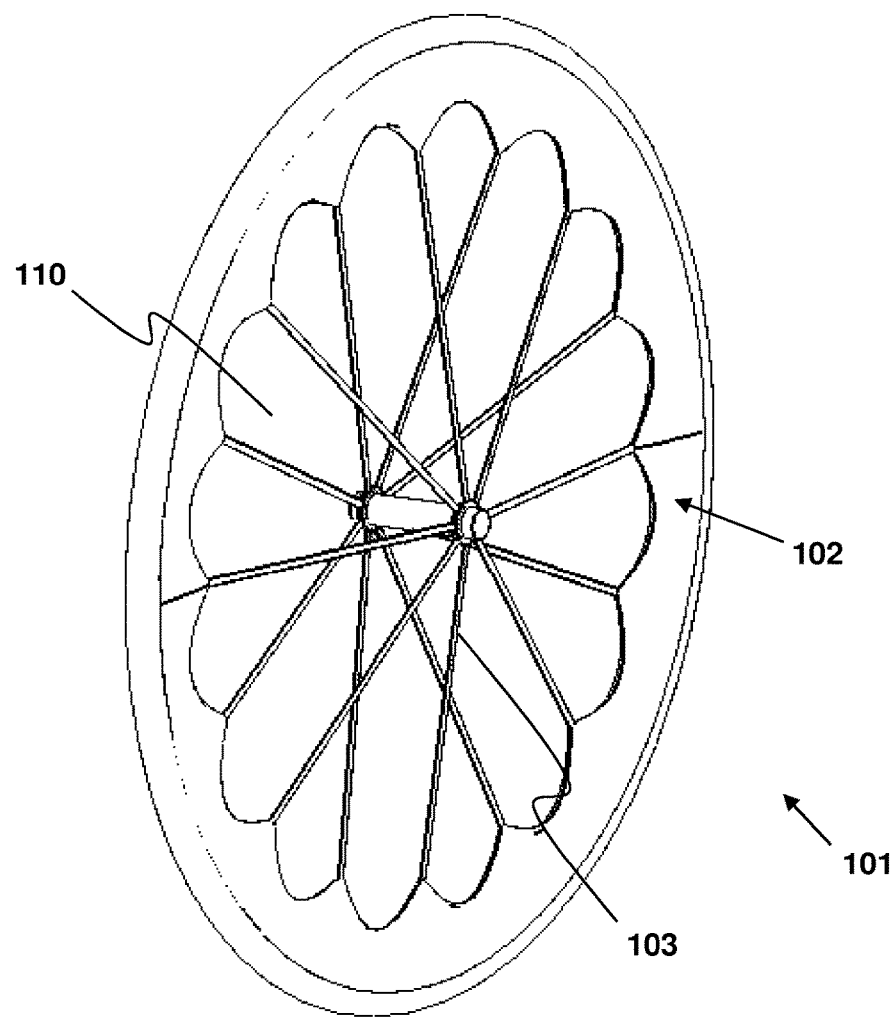
FIG. 11 is a perspective view of the wheel of FIGS. 9 and 10

A further embodiment of a wheel according to the invention is shown in FIGS. 9 to 11, which is generally designated 101.

The inner surface of the rim 102 defines recesses 110 at regular intervals along its length. The presence of the recesses 110 means that the inner surface 105 defines a plurality of support elevations 111, each having an angular apex. The profile of the support elevations 111 of the present embodiment is steeper than the profile of the elevations 9, 10 shown in FIG. 3.

Such support elevations 111 are located on either side of each recess 110. The support elevations 111 are therefore also spaced at regular intervals along the length of the inner surface 105 of the rim 102. When the wheel 101 is viewed from the side, as shown in FIG. 9, each recess 110 is symmetrical about a line drawn through the hub 104 and bisecting the two adjacent support elevations 111.

In this embodiment, the recesses 110 in the rim 102 are deeper than in the first embodiment. In addition, the support elevations 111 do not curve smoothly but instead have an angular apex. Furthermore, each of the elevations on the inner periphery of the rim is connected to a spoke 103.

In this embodiment, the support elevations 111 offer the advantage of reducing the stress experienced in the rim 102 at the point at which the spoke 103 is mounted.

Each spoke 103 connects one of the flanges 114 to the apex of one of the support elevations 111. A connection formation is provided at the apex of each support elevation 111. This connection formation is adapted to connect to a corresponding connection formation provided on the spoke 103. In the example shown in FIGS. 9 to 11, each elevation 111 is connected to the opposite flange 114 to its neighboring support elevations 111.

In use, the weight of the frame and rider passes through the hub 104 of each of the bicycle's wheels 101. This places stress on the wheel 101 and, in particular, on regions of the rims 102 in the vicinity of the points at which the spokes 103 connect to the inner surface 105 of the rims 102. Owing to the claimed configuration of the wheel, the stresses experienced in those regions are less than those experienced in corresponding regions of wheels 101 that do not have such a configuration.

The support elevation 111 for each spoke 103 reduces the stress experienced in the rim 102 at the point at which the spoke 103 is mounted. This means that a smaller quantity of material, or a lighter material, may be used to manufacture a wheel having the same strength as a conventional wheel, thereby reducing the weight of the wheel and possibly also manufacturing costs. Alternatively, a wheel may be manufactured having the same weight as conventional wheels, but with greater strength.

Figure 12:
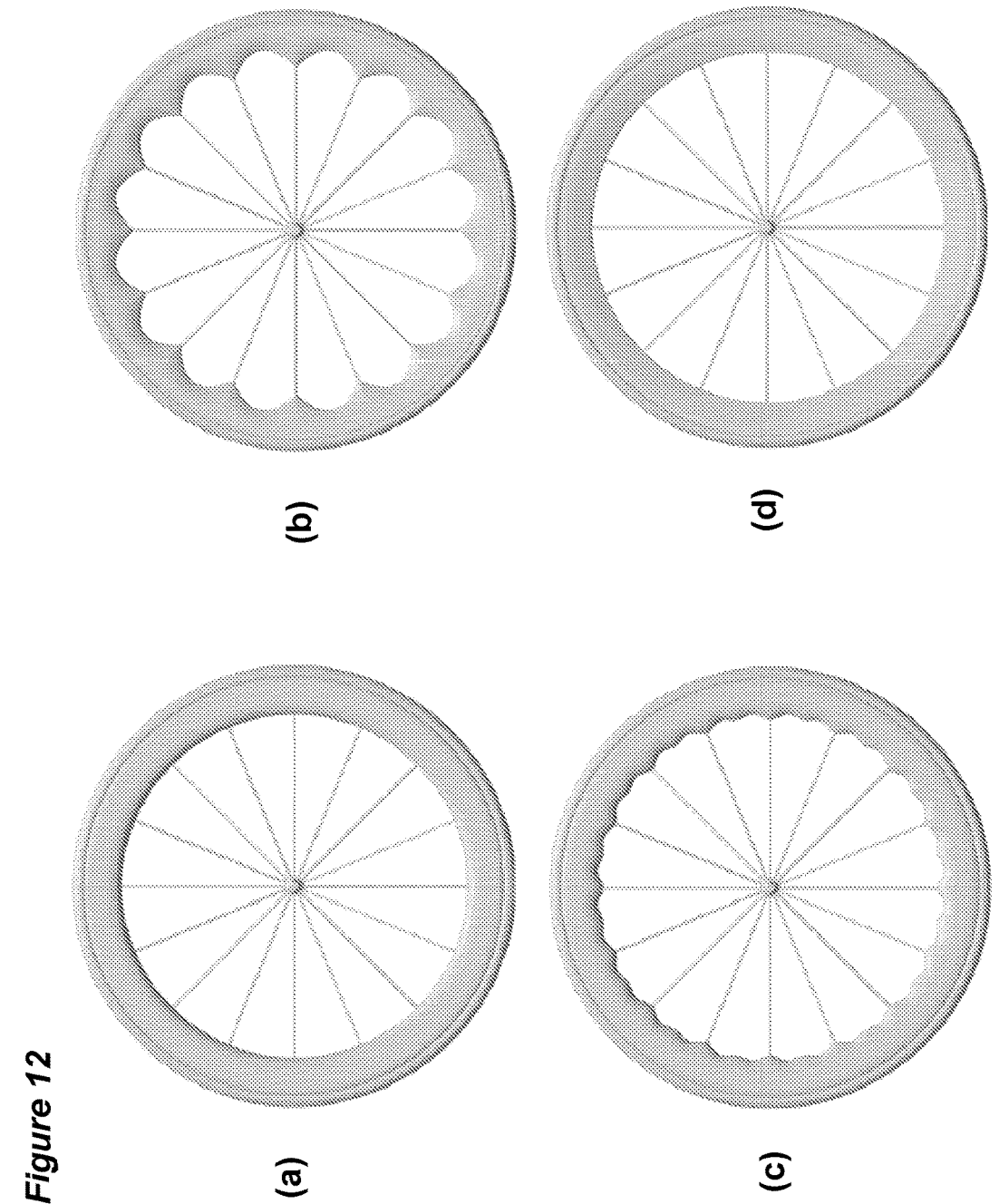
FIG. 12 shows side views of two conventional wheels, and two wheels according to the invention, which underwent CFD analysis.
Figure 13:
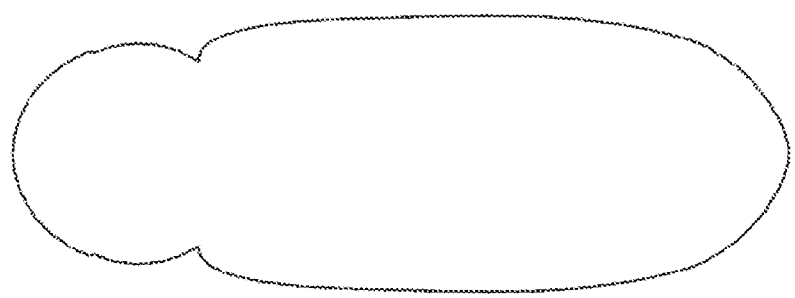
FIG. 13 shows the exterior cross-sectional profile of the rim of each wheel of FIG. 12.
Figure 13:
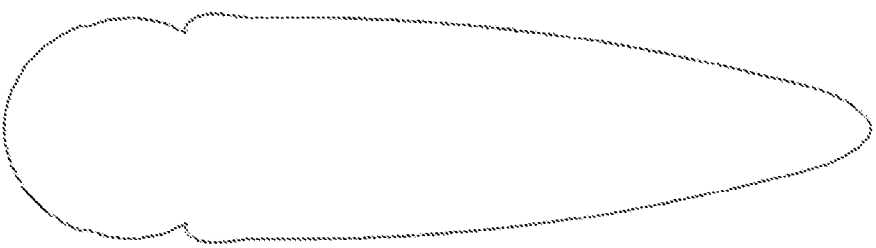
Figure 13:
Figure 13:
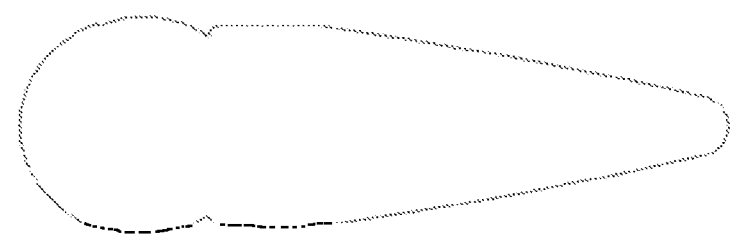

FIG. 12 shows side views of two conventional wheels, and two wheels according to the invention, which underwent CFD analysis. Wheels (a) and (d) have conventional, non-undulating rims. Wheel (c) has substantially the same configuration as the embodiment of the invention shown in FIGS. 1 to 4. Wheel (b) has substantially the same configuration as the embodiment of the invention shown in FIGS. 9 to 11. The exterior cross-sectional profile of each rim is shown in FIG. 13. Wheels (a) and (c) have profile with a greater thickness along the majority of its radial extent, and a radially inner edge with a more rounded form, relative to Wheels (b) and (c). However, each of wheels (a) to (d) has the same number of spokes and the same hub configuration. Furthermore, all spokes present in wheels (a) to (d) have the same cross-section. This ensures that any differences in results in the CFD analysis results between the wheels are caused by the different rim configurations rather than different spoke or hub configurations.

Computational Fluid Dynamics (CFD) analysis was carried out on these wheels, at a speed of 15 m/s, and at yaw angles of 0°, 5°, 10°, 15° and 20°. The data for the lift, drag and side forces, the torque, and the center of pressure for each wheel, at each yaw angle, are set out in FIG. 14.

Figure 15:
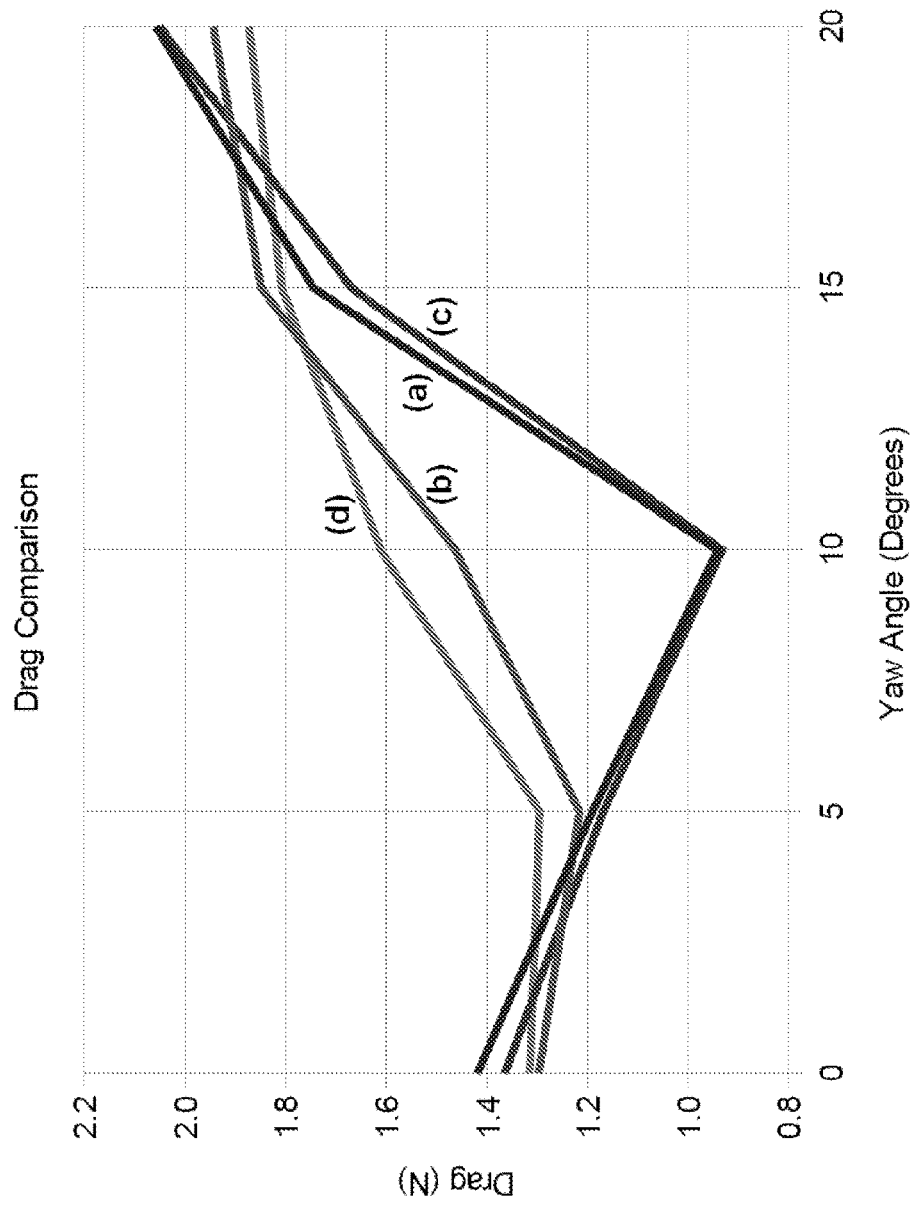
FIG. 15 illustrates the CFD analysis data of FIG. 14 relating to the drag forces across a range of yaw angles.

FIG. 15 illustrates the CFD analysis data of FIG. 14 relating to the drag forces across the range of yaw angles tested. Wheels (a) and (c) have the same cross-sectional shape, with the only difference being the undulating configuration of the radially inner edge of Wheel (c). The CFD data shows that at all of the yaw angles tested, the wheel with the undulating configuration, Wheel (c), has less drag than the wheel with the conventional, non-undulating configuration, Wheel (a). Similarly, Wheels (b) and (d) have the same cross-sectional shape, with the only difference being the undulating configuration of the radially inner edge of Wheel (b). The CFD data shows that at yaw angles of 0-10° at least, the wheel with the undulating configuration, Wheel (b), has less drag than the wheel with the conventional, non-undulating configuration, Wheel (d). The CFD data also shows that the least drag is achieved by Wheel (c), which has an undulating configuration in combination with a more rounded, radially inner edge.

Figure 16:
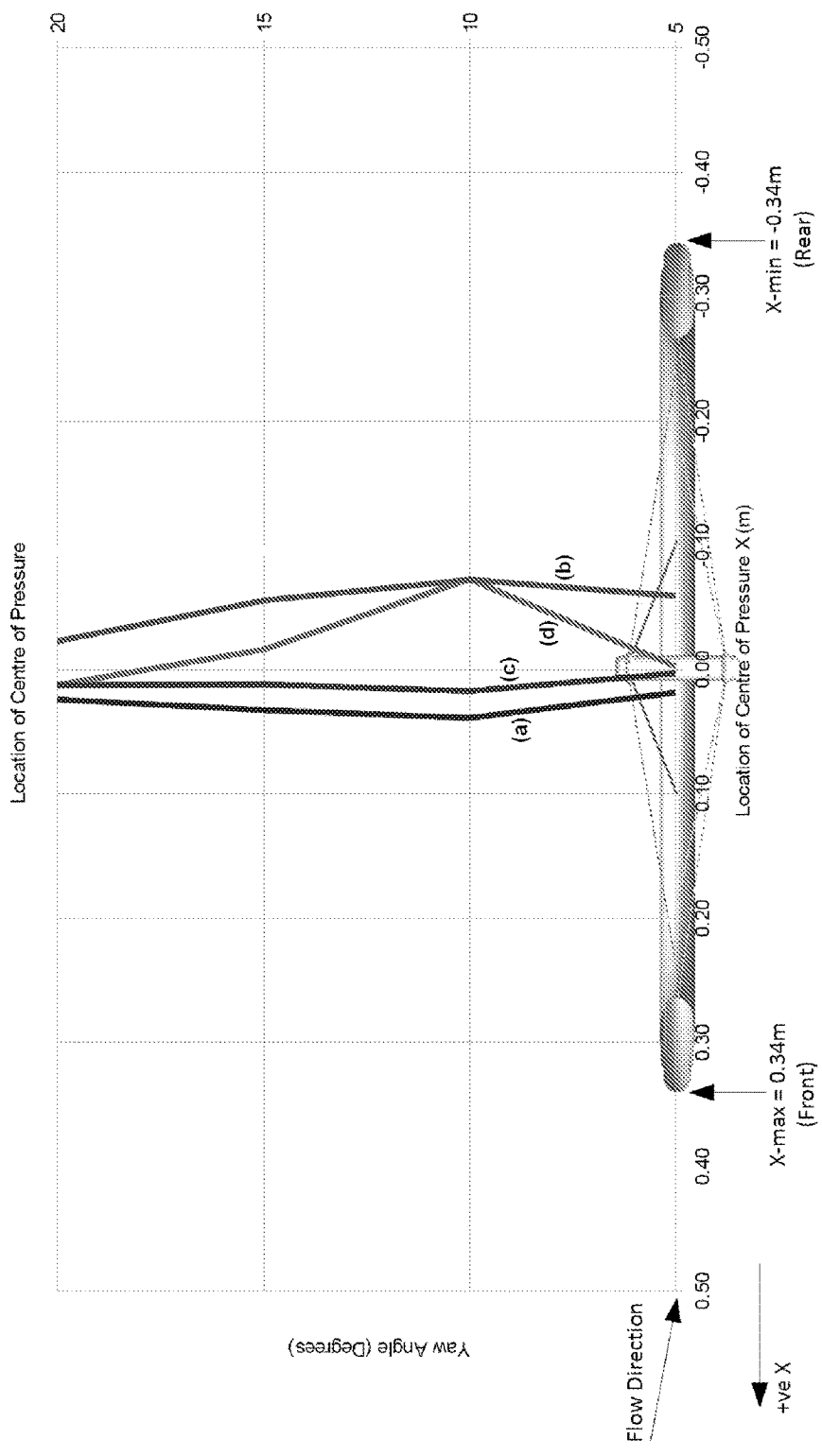
FIG. 16 illustrates the CFD analysis data of FIG. 14 relating to the location of the center of pressure across a range of yaw angles.

FIG. 16 illustrates the CFD analysis data of FIG. 14 relating to the location of the center of pressure across a range of yaw angles. Typically, the closer the center of pressure to the hub, the less force causing the front wheel to yaw experienced by the rider. This means the rider need not apply as large a steering input to counteract the effects of this force. The CFD data shows that the wheels that have a more rounded, radially inner edge. Wheels (a) and (c) have a center of pressure that is consistently a short distance to the front of the hub across the range of yaw angles tested. Of those wheels, the CFD data shows that at all of the yaw angles tested, the wheel with the undulating configuration, Wheel (c), has a center of pressure that is closer to the hub than the wheel with the conventional, non-undulating configuration, Wheel (a), across the range of yaw angles tested.

The invention claimed is:

1. A wheel for use with a bicycle, the wheel comprising:
a hub for mounting the wheel to a bicycle;
a rim about which a tire is mountable; and
a plurality of spokes extending between the hub and the rim,
wherein the rim has a radially inner edge, and wherein at least part of the radially inner edge has an undulating configuration and a radial distance that continuously varies between adjacent peaks and troughs of the undulating configuration, each peak of the undulating configuration having a convex exterior profile in a plane of the wheel.

2. A wheel as claimed in claim 1, wherein the undulating configuration is arranged along a circumference of the radially inner edge, such that the radially inner edge is either intermittently undulating or continually undulating.

3. A wheel as claimed in claim 1, wherein the radially inner edge is continually undulating.

4. A wheel as claimed in claim 3, wherein the radially inner edge comprises a series of alternating concave and convex regions positioned immediately adjacent to each other.

5. A wheel as claimed in claim 1, wherein the rim comprises side surfaces which are configured such that the radially inner edge is defined by rounded inner portions of the side surfaces.

6. A wheel as claimed in claim 1, wherein the radially inner edge has an arrangement of undulations arranged along the full extent of the radially inner edge.

7. A wheel as claimed in claim 1, wherein the undulating configuration defines a series of undulations located between points of connection of the radially inner edge and the spokes.

8. A wheel as claimed in claim 1, wherein the undulating configuration defines support elevations located in the region of connection of each spoke with the radially inner edge, and at least one ancillary elevation located between adjacent spoke connections.

9. A wheel as claimed in claim 1, wherein at least twenty-four pairs of peaks and troughs are provided along the radially inner edge of the rim.

10. A wheel as claimed in claim 1, wherein the difference in radial height between the peaks and troughs of the undulations is at least 10 mm.

11. A wheel as claimed in claim 10, wherein the difference in radial height between the peaks and troughs of the undulations is at least 20 mm.

12. A wheel as claimed in claim 1, wherein the rim is made of a composite material.

13. A wheel as claimed in claim 1, wherein the rim has side surfaces that curve laterally outwards from the base of the rim, and then curve laterally inwards, before meeting at the radially inner edge of the rim.

14. A wheel as claimed in claim 1, wherein the rim has side surfaces that meet at the radially inner edge of the rim, an exterior cross-sectional profile of the side surfaces at the radial inner edge of the rim having a radius of at least 5 mm.

15. A wheel as claimed in claim 1, wherein the exterior cross-sectional profile of the side surfaces at the radial inner edge of the rim has a radius of at least 10 mm.

16. A wheel as claimed in claim 1, wherein the radially inner edge of the rim is rounded.

17. A wheel for use with a bicycle, the wheel comprising:
a hub for mounting the wheel to a bicycle;
a rim about which a tire is mountable, the rim having a radially inner edge and side surfaces meeting at the radially inner edge;
a plurality of spokes extending between the hub and the rim; and
wherein at least part of the radially inner edge has an undulating configuration and a radial distance that continuously varies between adjacent peaks and troughs of the undulating configuration, and wherein an exterior cross-sectional profile of the side surfaces at the radial inner edge of the rim has a radius of at least 5 mm.

18. A wheel as claimed in claim 17, wherein a radial distance that varies between peaks and troughs of the undulating configuration and the difference in radial height between the peaks and troughs of the undulations is at least 5 mm.

19. A wheel as claimed in claim 17, wherein the rim is made of a composite material.

20. A wheel as claimed in claim 17, wherein the rim has side surfaces that curve laterally outwards from the base of the rim, and then curve laterally inwards, before meeting at the radially inner edge of the rim.

21. A wheel as claimed in claim 17, wherein the exterior cross-sectional profile of the side surfaces at the radial inner edge of the rim has a radius of at least 10 mm.

22. A wheel as claimed in claim 17, wherein at least twenty-four pairs of peaks and troughs are provided along the radially inner edge of the rim.

* * * * *